United States Patent
Staser et al.

(10) Patent No.: US 10,577,699 B2
(45) Date of Patent: Mar. 3, 2020

(54) ELECTROCHEMICAL CONVERSION OF LIGNIN TO INDUSTRIAL CHEMICALS

(71) Applicant: Ohio University, Athens, OH (US)

(72) Inventors: John Adams Staser, The Plains, OH (US); Omar Movil-Cabrera, Guayanilla, PR (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 15/749,830

(22) PCT Filed: Aug. 5, 2016

(86) PCT No.: PCT/US2016/045757
§ 371 (c)(1),
(2) Date: Feb. 2, 2018

(87) PCT Pub. No.: WO2017/024220
PCT Pub. Date: Feb. 9, 2017

(65) Prior Publication Data
US 2018/0223438 A1 Aug. 9, 2018

Related U.S. Application Data

(60) Provisional application No. 62/201,136, filed on Aug. 5, 2015.

(51) Int. Cl.
*C25B 3/00* (2006.01)
*C25B 3/02* (2006.01)
*C07G 1/00* (2011.01)
*C25B 11/04* (2006.01)
*C10G 1/08* (2006.01)

(52) U.S. Cl.
CPC .............. *C25B 3/02* (2013.01); *C07G 1/00* (2013.01); *C10G 1/086* (2013.01); *C25B 11/04* (2013.01); *C25B 11/0478* (2013.01)

(58) Field of Classification Search
CPC ..................................................... C25B 3/02
USPC .............................................. 205/421, 455
See application file for complete search history.

(56) References Cited

U.S. PATENT DOCUMENTS

| 4,341,608 A | 7/1982 | St. John |
| 2013/0040031 A1 | 2/2013 | Stecker et al. |
| 2014/0034508 A1* | 2/2014 | Stecker .................... C25B 3/02 |
| | | 205/448 |

FOREIGN PATENT DOCUMENTS

| EP | 0246957 A1 | 11/1987 |
| WO | 2015063763 A1 | 5/2015 |

OTHER PUBLICATIONS

Movil et al., "Non-Precious Metal Nanoparticle Electrocatalysts for Electrochemical Modification of Lignin for Low-Energy and Cost-Effective Production of Hydrogen," International Journal of Hydrogen Energy (2015), vol. 40, pp. 4519-4530. (Year: 2015).*
International Searching Authority, Search Report and Written Opinion issued in International Application No. PCT/US2016/045757 dated Nov. 11, 2016 (10 pages).
Lalvani, S.B., et al., "Lignin-Augmented Water Electrolysis," Electrochemical Society Letters, J. Electrochem. Soc., vol. 139, No. 1, Jan. 1992, The Electrochemical Society, Inc. (7 pages).
Movil, Omar, et al., "Non-precious metal nanoparticle electrocatalysts for electrochemical modification of lignin for wo-energy and cost-effective production of hydrogen," International Journal of Hydrogen Energy, Scitence Direct, 2015, http://dx.dio.org/10.1016/j.ijhydene.2015.02.023 (12 pages).
Reichert, Elena, et al., "Electra-catalytic oxidative cleavage of lignin in a protic ionic liquid," Phys. Chem. Chem. Phys., 2012, vol. 14, pp. 5214-5221 (8 pages).

* cited by examiner

*Primary Examiner* — Edna Wong
(74) *Attorney, Agent, or Firm* — Wood Herron & Evans LLP

(57) ABSTRACT

Lignin is electro-oxidized to commercially useful products using a binary transition metal catalyst. In particular, the transition metal catalyst includes nickel or cobalt as a first metal and any other transition metal as a second metal. The binary catalyst system prevents poisoning of the catalyst, extending the useful life of the catalyst.

7 Claims, No Drawings

ELECTROCHEMICAL CONVERSION OF LIGNIN TO INDUSTRIAL CHEMICALS

CROSS-REFERENCE TO RELATED APPLICATIONS

This application is a National Stage Entry under 35 U.S.C. § 371 of PCT Application No. PCT/US2016/045757, filed on Aug. 5, 2016, which claims priority to U.S. Application Ser. No. 62/201,136, filed Aug. 5, 2015, the disclosures of which are hereby incorporated by reference herein in their entireties.

TECHNICAL FIELD

The present invention relates generally to waste lignin and methods of converting same and, more specifically, to electrochemical conversion of lignin to industrial chemicals.

BACKGROUND

Lignin, a highly branched natural organic polymer which gives structural support to plants, is an underutilized biomaterial that currently enjoys few applications other than as a low-grade fuel for generating heat in pulping processes. After cellulose, lignin is the most abundant renewable carbon source; it has been estimated that between 40 and 60 million tons are produced annually, mostly as a non-commercialized waste product. Interestingly, lignin's complex structure, which is composed of many linked aromatic groups, holds potential as a renewable feedstock for a variety of industrial chemicals and liquid fuels. From highly functionalized monomeric or oligomeric aromatic products, which can be used as starting materials for pharmaceutical and chemical processes, to liquid fuels, lignin's oxidation valorization is potentially wide-ranging. The abundance of lignin as the primary waste from biorefineries and the kraft pulping process means that it could potentially replace a significant amount of fossil raw materials, such as petroleum, as a renewable feedstock for a host of chemicals, with substituted aromatics among the most interesting.

Several methods have been examined to convert lignin to more useful chemicals, including gasification in supercritical water, catalytic steam reforming at high temperatures, oxidative pyrolysis, catalytic hydrodeoxygenation and hydrocracking, hydrothermal fragmentation and condensation, and gasification in aqueous solutions over Pt catalysts. In general, though, such processes have not been able to overcome limitations such as achieving selective oxidation and generation of solid residue like char. Such catalytic processes are often difficult to control, and commercial viability has not been demonstrated.

Electrochemical conversion of waste lignin from pulping mills and biorefineries represents a potentially renewable process for generating industrial chemicals and drop-in replacement fuels without the need for petroleum or other fossil resources. In addition, electrochemical conversion of lignin is potentially more environmentally friendly than some other processes because conversion takes place in moderately alkaline solutions at low to moderate temperature and pressure and electrons driving the reaction can be described as non-polluting reagents. Accordingly, there is a need for an efficient method of converting lignin that addresses the above drawbacks.

Prior attempts to electro-oxidize lignin are not particularly suited for commercialization. In many cases, the catalysts are not efficient or are too expensive. Also, many catalysts are quickly poisoned.

SUMMARY

Embodiments of the present invention generally relate to the electrochemical conversion of lignin to a variety of industrial products using a binary transition metal catalyst specifically, a binary catalyst with nickel or cobalt as a first metal and any transition metal as a second metal. These catalysts are inexpensive and have a relatively long life.

Electrochemical conversion of waste lignin from pulping mills and biorefineries is an alternative renewable process for generating industrial chemicals that may afford better control over conversion than other catalytic or thermochemical processes because the electrode potential, and hence the reaction energetics, can be controlled. Further, electrochemical conversion of waste lignin represents a possible positive impact on pulping mills and biorefineries because it could provide a renewable raw material that can be used to generate additional revenue streams and enhance the value of biomass while potentially reducing the cost of bioenergy.

The objects and advantages of present will be appreciated in light of the following detailed descriptions and drawings in which:

DETAILED DESCRIPTION

In an embodiment, binary transition metal electrocatalysts are used to electrochemically oxidize lignin. The lignin can be from any source, such as from pulp and paper manufacturing, bio-refining lignin as well as others.

The catalyst utilized in the present invention will be a binary transition metal catalyst having two different transition metals. The first metal of the binary transition metal catalyst will be either nickel or cobalt and the second transition metal catalyst will be any transition metal, including nickel or cobalt, and excludes pure nickel or cobalt. The atomic ratio of nickel or cobalt to the second transition metal can vary from 5:1 to 1:5, generally 3:1 to 1:3, and optimally 1:1.

The second transition metal prevents the primary metal from being poisoned. Therefore there must be sufficient second transition metal present to extend lifetime of the catalyst. If the lifetime of the catalyst is undesirably shortened, the amount of second transition metal should be increased to avoid this problem. By incorporating a 1:1 ratio, the life of the catalyst is basically indefinite. Specific examples include NiCo, NiCu, CoCu, NiPt and CoPt.

Lignin may be added to an alkaline solution formed from a strong base. Generally, the concentration of the strong base (such as NaOH and KOH) will be 0.1 M to 6 M. The electrochemical oxidation may have a potential ranging from 0.25 to 0.75 V vs. SHE with the binary electrocatalyst as the working electrode. The time range can be from a few minutes to over one hundred hours at each potential in the potential range. The electrochemical oxidation may be conducted generally at 20-30° C. and at atmospheric pressure, although the present invention can function outside those conditions.

In an aspect of the present invention, the lignin oxidation process is quasi-reversible with intermediate heterogeneous charge transfer rate constants. It is likely that, due to lignin's complex structure, the oxidation mechanism is complex, with possible proceeding homogeneous chemical reactions.

It is believed that .OH radicals are primarily responsible for the electrochemical oxidation of lignin. Further, due to the prevalence of carbonyl groups in the oxidation products, it is believed that oxidation of hydroxyl groups present in lignin's quaiacyl units is a main contributor to lignin oxidation. Medium length and branched hydrocarbons present in the oxidation product streams result from significant destruction of the aromatic rings, and the extent of ring destruction could be controlled by controlling the oxidation potential or by controlling oxidation time. Formation of other oxidation products like 1,3-bis(1,1-dimethylethyl)-benzene and 1,4-di-tert-butylphenol suggest oxidative decomposition initiated by hydroxyl radicals that are likely generated at the anode.

Overall, the electrochemical oxidation of lignin is complex, with possibly many competing homogeneous chemical and heterogeneous electrochemical reactions. Useful products that may be formed during the electrochemical oxidation of lignin according to one embodiment of the present invention may include, for example: 3-methylbenzaldehyde, isoshyobunone, apocynin, benzophenone, 1,2-dimethoxy-4-(1-propenyl)-benzene, Benzestrol, Hexastrol, and Cannabidiol. Table 1 below shows some of the products that may be produced from the electrochemical oxidation of lignin according to one embodiment of the present invention where the electrochemical oxidation occurred for 24 hours with a potential of 0.5 V vs. SHE.

TABLE 1

| Volatile Compound | Concentration (g/L) | |
| --- | --- | --- |
| | Prior to Oxidation | 24 Hours at 0.5 V vs. SHE |
| 1,4-Diacetyl-3-acetoxymethyl-2,5-methylene-l-rhamnitol | — | 6.91E−04 |
| 1H-Pyrrole-2-carboxaldehyde | 3.48E−03 | 5.30E−03 |
| 2(3H)-Furanone, dihydro-4,4-dimethyl- | — | 2.46E−04 |
| 2(3H)-Furanone, dihydro-5-methyl- | 4.79E−03 | 8.08E−03 |
| 2,4(1H,3H)-Pyridinedione, 1-β-D-ribofuranosyl- | — | 7.60E−04 |
| 2-Ethyl-5-propylcyclopentanone | — | 2.24E−04 |
| 2-Furancarboxylic acid | 4.05E−03 | 4.73E−03 |
| 2-Furanmethanol | 3.69E−03 | 4.85E−03 |
| Apocynin | — | 6.38E−04 |
| Butanoic acid | 3.10E−02 | 4.37E−02 |
| Butyrolactone | 1.45E−03 | 2.19E−03 |
| Decane, 2,6,7-trimethyl- | — | 2.57E−04 |
| Ethanol, 2,2'-oxybis-, diacetate | 1.52E−03 | 1.76E−03 |
| Formic acid, decyl ester | — | 1.83E−04 |
| Furfural | 3.04E−03 | 3.99E−03 |
| Heptadecanoic acid, heptadecyl ester | — | 2.89E−04 |
| Heptanediamide, N,N'-di-benzoyloxy- | 8.00E−04 | 1.98E−03 |
| Hexane, 1-(methoxymethoxy)- | 3.38E−04 | 5.76E−04 |
| Hexanoic acid | 3.41E−03 | 7.35E−03 |
| L-Glucose | — | 2.01E−04 |
| n-Hexadecanoic acid | — | 1.35E−03 |
| Pentanoic acid | 4.38E−03 | 7.17E−03 |
| Phenol, 3,4-dimethoxy- | — | 2.91E−04 |
| Phenyl a-d-sedoheptuloside | — | 1.83E−04 |
| β-(4-Hydroxy-3-methoxyphenyl)propionic acid | 7.67E−03 | 1.28E−02 |
| Vanillin lactoside | — | 4.26E−04 |

Of the several possible electrochemical oxidation products, some are known to have importance either in industrial processes or research laboratories. For example, heptane is a non-polar solvent commonly used in research laboratories. Further, apocynin may be used as an antioxidant in endothelial cells, while 2,4-di-tert-butylphenol has been investigated as an agriculturally relevant anti-fungal and is commonly used as a UV stabilizer and antioxidant for hydrocarbon-based products, and to prevent gumming in aviation fuels. It should be recognized that some separation or product purification may be required for industrially relevant processes based on the electrochemical conversion of lignin.

In an aspect of the present invention, specific compounds and/or product distributions are targeted by controlling the oxidation parameters. In that regard, electrochemical pathways provide a measure of control over oxidation of complex organic compounds, with the potential to narrow oxidation products down to a particular molecular weight range by controlling 1) the oxidation potential (hence, reaction energetics) and/or 2) oxidation time, as described further below. The selectivity of useful products may vary depending on the oxidation parameters. In an embodiment, the selectivity of useful products may be at least 66% by mass. It should be recognized that the product distribution, selectivity, etc. may also vary due to the variation in the unoxidized lignin within a single biomass sample.

In an aspect of the present invention, the identity of the products derived from lignin's oxidation varies as a function of oxidation potential. For example, oxidation at low potentials (e.g., 0.25 V vs. SHE) may not adequately oxidize the biomass, meaning undesired products such as butanoic acid, hexanoic acid and similar branched or functionalized organic compounds present in the unoxidized lignin are still present after oxidation. However, a low potential does generate a useful product—vanillin. The vanillin may be formed from partial oxidation of vanillin lactoside present in the unoxidized lignin. Further, higher potentials (e.g., 0.75 V vs. SHE) may lead to formation of undesired products such as 4-methylheptane, methyl isobutyl ketone, etc., not to mention potential oxygen evolution competing with lignin oxidation. A higher potential may break aromatic rings, which then form carbon chains. Additionally, more useful products (e.g., vanillin, benzaldehyde) present in the unoxidized sample may be converted to other products under a higher potential. In an embodiment, the oxidation parameters may be configured to target the formation of substituted phenolic compounds for use in, for example, resin binders.

In an aspect of the present invention, the identity of the products derived from lignin's oxidation varies as a function of oxidation time. Some key oxidation product concentrations increased steadily over time, suggesting they are likely stable products that do not participate in other reactions; such stable products may be useful in industry or may be used as replacement fuels. Concentrations of other oxidation products increase and then decrease with time, suggesting that they may participate in proceeding chemical or electrochemical reactions. The following are products that may be produced from the electrochemical oxidation of lignin according to one embodiment of the present invention. Heptane may be common to all oxidation times. At shorter oxidation times, some substituted phenolic compounds are generated, including 2-methoxyphenol, benzoic acid, apocynin, 1-(4-hydroxy-3,5-dimethoxyphenyl)-ethanone and 2,4-di-tertbutylphenol. Also at shorter oxidation times, branched hydrocarbons, such as 2,6-dimethylnonane and 2,4-dimethyl-1-heptene, are generated. Several of these oxidation products are observed at longer oxidation times, meaning that these products are likely stable and do not participate in homogeneous chemical reactions but instead remain in solution indefinitely upon formation.

In another aspect of the present invention, the rate of production of the different products derived from lignin's oxidation varies. For example, the rate of production of useful products is $3.7 \times 10^{-4}$ g/L-h. Useful products include 6-carbon aromatic compounds with functional groups at the ortho and para positions, in the molecular weight range from 150-300 g/mol. Further, the rate of production of potentially useful products is $1.8 \times 10^{-4}$ g/L-h. Potentially useful products include other aromatic compounds that do not fit into the "useful product" category, but that may find use in applications like resin and resin binders, or precursors for those materials.

In order to facilitate a more complete understanding of the embodiments of the invention, the following non-limiting example is provided.

EXAMPLE 1

Materials.

Lignin (10,000 g/mol) was purchased from Sigma-Aldrich and used as received. $CoCl_2.H_2O$, $H_2PtCl_6$ solution (8 wt % in H2O), and ethylene glycol (EG) were purchased from Sigma-Aldrich. NaOH and KOH were acquired from Fisher Scientific and Vulcan XC-72 carbon was obtained from Cabot. All materials were used as received.

Electrocatalyst Synthesis.

Co core/Pt partial shell alloy nanoparticles were synthesized using the polyol method.

Electrochemical Characterization—Cyclic Voltammetry Method.

Cyclic voltammetry was conducted in 1 M KOH at 0.05 V/s in the absence of lignin as a background. Next, lignin was added to the alkaline solution so that its concentration was 10 g of lignin per liter, and cyclic voltammetry was conducted at scan rates ranging from 0.05 V/s to 0.5 V/s. Then, a rotating disk electrode (RDE) with the Co core/Pt partial shell electrocatalyst was rotated from 200 rpm to 1700 rpm and the potential of the working electrode was scanned for kinetic studies. Finally, the working electrode potential was held constant at 0.598 V vs. SHE, and solution was periodically pipetted and stored in a vial to identify oxidation products via GCeMS.

Electrochemical Characterization—Cyclic Voltammetry Results.

Cyclic voltammograms at 0.05 V/s in 1M KOH both in the absence of lignin and in a solution containing 10 g lignin per liter were taken. In the absence of lignin, no anodic current is observed in the forward scan up to approximately 0 V vs. SHE, increasing to an oxidation peak at 0.4 V vs. SHE representing oxidation of the Co core, most likely to $Co(OH)_2$ or $Co_3O_4$ as described by colbalt's thermodynamics in alkaline solution. At higher potentials, mass activity (defined as A/g metal in the catalyst) increases rapidly, attributed to oxygen evolution in alkaline media. Upon scanning the potential in the cathodic direction, a distinct reduction peak is observed at 0.22 V vs. SHE, with additional peaks at 0.11 V vs. SHE and –0.10 V vs SHE. These anodic and cathodic peaks may be attributed to oxidation and reduction of the Co core, respectively. The positions of the peaks indicate that oxidation and reduction of the Co core is likely not a completely reversible process as indicated by peak separations of 0.17 V, 0.29 V and 0.50 V. Peak separations for reversible, single-electron transfer processes are 0.059 V.

In contrast to the cyclic voltammogram in the absence of lignin, upon addition of 10 g of lignin per liter of 1 M KOH solution, significant oxidation current is observed at slightly less than 0 V vs. SHE, with an oxidation peak at 0.11 V vs. SHE that is not observed in the absence of lignin. The oxidation peak centered at 0.4 V vs. SHE in the absence of lignin shifted in the cathodic direction to 0.34 V vs. SHE with a decrease in magnitude; this peak is likely still due to electrochemical oxidation of the Co core, although the decrease in magnitude is indicative of passivation of the transition metal core. A further broad oxidation peak is observed at 0.64 V vs. SHE, while a similar peak is not observed in the absence of lignin. Two peaks can be attributed to electrochemical oxidation of lignin or its oxidation products or active intermediates, with some pathways likely facilitated by .OH radicals leading to removal of an electron from the biopolymer or its active intermediates, as discussed in previous literature results. Such radical mediated oxidation is likely driven by single-electron transfer at the anode, a possible mechanism for the Co core/Pt partial shell electrodes:

Co core/Pt partial shell anode: $H_2O - e^- \rightarrow .OH + H^+$ (1)

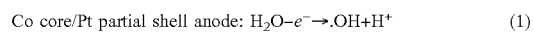

Pt ring cathode: $H_2O + e^- \rightarrow H_{ads} + OH^-$ (2)

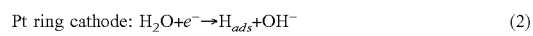

Lignin degradation: $R + .OH + H_{ads\text{-}anode} \rightarrow ROH + R'H$ (3)

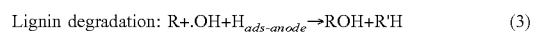

where R represents the lignin biopolymer or its partially degraded product and the electrochemical oxidation of lignin is initiated by water electrolysis generating hydroxyl radicals that in turn oxidize lignin. Oxidation products like 1,3-bis(1,1-dimethylethyl) benzene and 2,4-di-tert-butyl-phenol indicate an oxidative decomposition pathway initiated by radicals in alkaline media.

Upon scanning the potential in the cathodic direction, two distinct but very broad reduction peaks are observed between 0.2 and 0.3 V vs. SHE (peaks 2c1 and 2c2), in contrast to the single sharp reduction peak in this range observed in the absence of lignin. These broad reduction peaks could be due to reduction of the oxidized Co core or reduction of lignin oxidation products or active intermediates. The peak potential separation between 2a2 and 2c1 is approximately 0.059 V, indicating a single-electron reversible process, while the other peak separations indicate a quasi-reversible or completely irreversible process. The reversibility of the single-electron process coupled at peaks 2a2 and 2c1 indicates oxidation and reduction of the Co core, perhaps resulting from passivation and reduction of the Co core, while the irreversibility of the process coupled at new peaks 2a3 and 2c2 indicates a process involving lignin. Two more broad reduction peaks are observed around 0.10 and –0.10 V vs. SHE, similar to peaks that were observed in the absence of lignin. These peaks are likewise attributed to further reduction of the transition metal core.

The cyclic voltammetry analysis suggests that two key processes are taking place: 1) oxidation/reduction of the Co core with likely passivation in the presence of lignin and 2) oxidation/reduction of lignin, its products and active intermediates. At this point, one can hypothesize that the charge transfer reactions involving lignin are partially driven by .OH radicals and likely involve transfer of a single electron. The electrochemical processes are likely either quasi-reversible or completely irreversible, and multiple species participate in the electrochemical processes, meaning that this mechanism is likely complex and may lead to several different products.

Cyclic voltammograms in solution containing 10 g of lignin per liter were taken at scan rates ranging from 0.05 V/s to 0.5 V/s. As expected, the anodic and cathodic peak mass activities increase upon increasing the scan rate. Also interesting to note is the shift in the anodic direction of the oxidation peaks and shift in the cathodic direction of the reduction peaks upon increasing scan rate. The shifts in peak potential suggest that the electrochemical reaction is likely under at least partial diffusion control at these conditions, and also indicate a quasi-reversible electrochemical reaction. Interestingly, the two distinct oxidation peaks observed at lower scan rates (peaks 2c1 and 2c2) merge so that they are no longer distinct, indicating that the two likely processes (reduction of the transition metal core and reduction of lignin's oxidation products) occur at similar potentials and likely compete. At progressively higher scan rates, the charge transfer processes are still not reversible, as evidenced by the peak separation. Irreversibility at progressively higher scan rates can indicate that oxidation products are not present for reduction, meaning that either 1) the oxidation products are readily transported away from the electrocatalyst surface before they can be reduced or 2) homogeneous chemical reactions consume oxidation products on time scales similar to charge transfer processes. Thus, the mechanism of lignin oxidation is complex and likely follows several possible pathways, with cyclic voltammetry at different scan rates indicating that the process is not reversible.

Observing the behavior of the peak anodic mass activity as a function of scan rate at different peak potentials can demonstrate diffusion control of charge transfer processes involving lignin. The linear dependence of the peak mass activity with respect to the scan rate is an indication of a diffusion controlled process. Thus, one can conclude that 1) charge transfer processes involving lignin are not reversible and 2) the complex structure of lignin or its oxidation products leads to significant mass transport limitations that affect the electrochemical mechanism. The electrochemical mechanism is likely complex, and homogeneous chemical reactions may compete on the time scale of the charge transfer process.

Electrochemical Characterization—Electrode Kinetics Method.

The electrocatalyst was suspended in an equal volume solution of ethanol and water so that the concentration was 1 mg of catalyst per mL of 1:1 ethanol:water mixture. After ultrasonication to disperse the electrocatalyst in the 1:1 ethanol:water mixture, 25 mg of electrocatalyst was suspended drop-wise on a Pt rotating disk electrode (RDE); the ethanol:water solution was evaporated by gently heating the Pt RDE in a typical laboratory oven at 70° C. until only the electrocatalyst remained on the disk. Electrochemical measurements were conducted in a standard three-electrode beaker cell, with the Co core/Pt partial shell alloy electrocatalyst as the working electrode. A Hg/HgO electrode served as the reference, and a Pt ring positioned 2 cm away from the working electrode served as the counter electrode. Although the reference electrode was Hg/HgO, the potentials were later referenced against the standard hydrogen electrode (SHE) for analysis and reported as such in this work. The electrochemical experiments were conducted at room temperature and under atmospheric conditions.

Electrochemical Characterization—Electrode Kinetics Results.

Because the electrochemical oxidation of lignin is under diffusion control at the experimental conditions, RDE studies at constant potential scan rate were performed to minimize mass transport limitations. Anodic mass activity at two different working electrode potentials (0.138 and 0.598 V vs. SHE) was measured as a function of disk rotation rate. A linear trendline to represent infinite rotation simulates the idealized condition of no mass transport limitations, where the observed mass activity is only a function of kinetics. The mass activity at that point is known as the heterogeneous rate constant limited current, $i_k$. The heterogeneous rate constant, $k^0$, can be estimated by the following equation:

$$k^0 = \frac{i_k}{nFAC} \quad (4)$$

where n is the number of electrons transferred in the electrochemical reaction, F is Faraday's constant, A is the area of the working electrode and C is the concentration of lignin in mol/cm$^3$.

Because it is likely that .OH radicals facilitate the electrochemical process, it is valid to assume that a single electron is transferred during the lignin oxidation step. The geometric area of the working electrode was 0.2 cm$^2$, and, using the specifications provided by the supplier that the molecular weight of the lignin was 10,000 g/mol, the concentration of lignin was calculated to be $1\times10^{-6}$ mol/cm$^3$. Applying this analysis to the RDE data, one can estimate the heterogeneous rate constant $k^0$ as $2.1\times10^{-3}$ cm/s at 0.138 V vs. SHE and $1.4\times10^{-2}$ cm/s at 0.598 V vs. SHE. Those values for the heterogeneous rate constant for the charge transfer processes occurring at those potentials were intermediate, indicating that the electrochemical oxidation of lignin is a quasi-reversible process. In that sense, the kinetic analysis confirmed the cyclic voltammetry results presented already that suggest electrochemical oxidation of lignin is not reversible. In this case, the results indicated that oxidation products readily undergo proceeding homogeneous chemical reactions at rates comparable to charge transfer processes, competing with these processes and precluding subsequent electrochemical reduction.

The heterogeneous rate constant on the Co core/Pt partial shell electrocatalysts suggests that these materials are suitable electrocatalysts for oxidation of lignin. As discussed already through the cyclic voltammetry studies, it is likely that homogeneous chemical reactions involving lignin oxidation products occur at similar rates to the charge transfer processes, so estimation of the charge transfer kinetics provides some indication of the rate of homogeneous reactions.

Identification of Lignin Oxidation Products Method.

A ThermoFisher Trace 1300 ISQ GC-MS with a 60 m TraceGOLD GC column (0.25 mm ID, 0.25 mm film) was used to identify the lignin oxidation products from the standard NIST database included with ThermoFisher's Chromeleon software. Oxidation samples collected during constant-potential oxidation, as described above, were neutralized with $H_2SO_4$ and the oxidation products were extracted into chloroform. Oxidation samples were injected into the GC-MS with the following protocol: 1:75 split, hold at 50° C. for 3 min, ramp at 10° C. per minute to 270° C., hold for 20 min. The peak areas of the oxidation products as calculated by the Chromeleon software were compared to the peak area of a reference standard (2-fluorophenol) at 500 ppm to estimate product concentrations, assuming that nearly all of the volatile oxidation products were extracted into chloroform upon neutralization of the oxidation product solution. The product concentrations were measured as a function of time to determine changes in the product stream during constant-potential oxidation, and product generation rates were determined as a function of electrocatalyst loading (mass of electrocatalyst in the system). Unoxidized lignin dissolved in 1 M KOH (standard oxidation solution) was analyzed via GC-MS after the volatile components were extracted into chloroform. The unoxidized lignin served as a background for comparison with the oxidation product samples.

Identification of Lignin Oxidation Products.

The only volatile compound identified at any appreciate concentration (greater than 0.01 ppm) in the unreacted lignin sample was vanillin, indicating that vanillin was present in the lignin samples purchased from Sigma-Aldrich. Lignin was oxidized at a constant potential of 0.598 V vs. SHE, and oxidation products were periodically withdrawn by pipette for GC-MS analysis. The oxidation products depended on the oxidation time, as did their concentrations. For oxidation products with concentrations greater than 0.01 ppm, heptane was common to all oxidation times, and its increasing concentration (from 0.42 ppm after 83 min of oxidation to 0.50 ppm after 2700 min of oxidation) suggests that it is a stable product and may not participate at an appreciable rate in other reactions. A similar increasing trend is observed with 2,4-dimethyl-1-heptene, as its concentration increased from 0.07 ppm to 0.26 ppm between 83 min and 2700 min of constant-potential oxidation. Likewise, the concentration of 1,3-bis(1,1-dimethylethyl)-benzene also increased (from 0.14 ppm to 0.41 ppm).

In contrast to the oxidation products whose concentration increases over time, some products showed increasing and then decreasing concentrations, which suggests they may form initially as lignin oxidation products, and then themselves participate in other reactions, either proceeding electrochemical or homogeneous chemical reactions. For example, vanillin, which was present in the unoxidized lignin sample at 0.6 ppm concentrations, increased rapidly to 8.45 ppm after 83 min, decreased to 7.43 ppm after 1200 min, and increased again to 9.83 ppm after 2700 min. This trend suggests that vanillin is a primary product of lignin oxidation, and that vanillin itself participates in other reactions. Vanillin's generation rate may increase at longer oxidation times, when there has been significant degradation of the lignin biopolymer, which could explain the increase in concentration at longer times. In such a case, the rate of electrochemical generation of vanillin would offset and outpace the rate of vanillin conversion to other products.

Of note, the oxidation product concentrations were low, typically less than a few ppm, especially considering the initial lignin concentration (10 g lignin per liter, corresponding to 10,000 ppm). The reason for the low concentration of oxidation products was the extremely low current (i.e., reaction rate) obtained in the beaker cell. Because the electrocatalyst loading was small (25 µg catalyst) the current was correspondingly small (on the order of several µA). That small reaction rate led to low overall lignin conversion and low product concentrations. However, one can analyze rates of production of specific oxidation products on a g/L (or ppm) per mass of catalyst basis as a function of time. For example, between 1200 min and 2700 min oxidation, the concentration of apocynin increased from 1.62 ppm ($1.62 \times 10^{-3}$ g/L) to 2.49 ppm ($2.49 \times 10^{-3}$ g/L). With 25 µg catalyst, the rate of change in apocynin concentration between 1200 min and 2700 min was $2.3 \times 10^{-2}$ g/L per g catalyst per minute. The rate of 2-methoxyphenol production over the same time period was $5.0 \times 10^{-3}$ g/L per g catalyst per minute. Those rates suggest that moderate electrocatalyst loadings (on the order of 100 g) would result in fairly rapid oxidation product concentration changes, on the order of several g/L per minute.

While specific embodiments have been described in considerable detail to illustrate the present invention, the description is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A method for producing industrial products, the method comprising:
    electrochemically oxidizing lignin using a binary transition metal catalyst including a first metal and a second metal that is a different transition metal from said first metal to produce one or more industrial products;
    wherein said first metal is Co, said second metal is Pt, and said binary transition metal catalyst is CoPt.

2. The method claimed in claim 1, wherein the atomic ratio of said first metal to said second metal is from 5:1 to 1:5.

3. The method of claim 2, wherein said atomic ratio is from 3:1 to 1:3.

4. The method claimed in claim 2 wherein said atomic ratio is 1:1.

5. The method claimed in claim 1 further comprising applying an electrode potential to an aqueous basic solution of said lignin.

6. The method claimed in claim 5 wherein said electrode potential is greater than 0.25 V vs SHE and less than 0.75 V vs SHE.

7. The method claimed in claim 5 wherein said solution has 0.1 M to 6 M of a strong base.

* * * * *